(12) United States Patent
Hosseinimakarem et al.

(10) Patent No.: US 11,194,516 B2
(45) Date of Patent: Dec. 7, 2021

(54) MEDIA TYPE SELECTION

(71) Applicant: Micron Technology, Inc., Boise, ID (US)

(72) Inventors: Zahra Hosseinimakarem, Boise, ID (US); Carla L. Christensen, Boise, ID (US); Radhika Viswanathan, Boise, ID (US); Bhumika Chhabra, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 47 days.

(21) Appl. No.: 16/596,311

(22) Filed: Oct. 8, 2019

(65) Prior Publication Data
US 2021/0103404 A1 Apr. 8, 2021

(51) Int. Cl.
*G06F 3/06* (2006.01)

(52) U.S. Cl.
CPC .......... *G06F 3/0659* (2013.01); *G06F 3/0604* (2013.01); *G06F 3/068* (2013.01); *G06F 3/0635* (2013.01); *G06F 3/067* (2013.01)

(58) Field of Classification Search
None
See application file for complete search history.

(56) References Cited

U.S. PATENT DOCUMENTS

| | | |
|---|---|---|
| 6,297,988 B1 | 10/2001 | Parker et al. |
| 9,715,444 B2 | 7/2017 | Lee et al. |
| 2008/0126680 A1 | 5/2008 | Lee et al. |
| 2008/0209114 A1 | 8/2008 | Chow et al. |
| 2009/0060459 A1* | 3/2009 | Ishii ........................ G11B 20/10 386/239 |
| 2012/0105572 A1* | 5/2012 | Sammon ............ H04N 5/23245 348/14.08 |
| 2014/0229656 A1 | 8/2014 | Goss et al. |

(Continued)

FOREIGN PATENT DOCUMENTS

| | | |
|---|---|---|
| KR | 1020130135618 A | 12/2013 |
| WO | 2010078044 | 7/2019 |

OTHER PUBLICATIONS

International Search Report and Written Opinion from related international application No. PCT/US2020/054667, dated Jan. 22, 2021, 10 pages.

*Primary Examiner* — Brian R Peugh
(74) *Attorney, Agent, or Firm* — Brooks, Cameron & Huebsch, PLLC

(57) ABSTRACT

Systems, apparatuses, and methods related to media type selection are described. Memory systems can include multiple types of memory media (e.g., volatile and/or non-volatile) and can write data to the memory media types. Data inputs can be written (e.g., stored) in a particular type of memory media based on characteristics (e.g., source, attributes, and/or information etc. included in the data). For instance, selection of memory media can be based on characteristics of the memory media type and the attributes of the data input. In an example, a method can include receiving, by a memory system that comprises a plurality of memory media types, data from at least one of a plurality of sensors, identifying one or more attributes of the data; and selecting, based at least in part on the one or more attributes of the data, one or more of the memory media types to write the data to.

22 Claims, 7 Drawing Sheets

(56) References Cited

U.S. PATENT DOCUMENTS

| | | |
|---|---|---|
| 2015/0339319 A1 | 11/2015 | Malina |
| 2016/0117266 A1 | 4/2016 | Anderson |
| 2017/0017411 A1 | 1/2017 | Choi et al. |
| 2019/0303038 A1 | 10/2019 | Hubbard |
| 2020/0177835 A1* | 6/2020 | Muncy ................. H04N 9/8205 |

* cited by examiner

MEDIA TYPE SELECTION

TECHNICAL FIELD

The present disclosure relates generally to semiconductor memory and methods, and more particularly, to apparatuses, systems, and methods for media type selection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
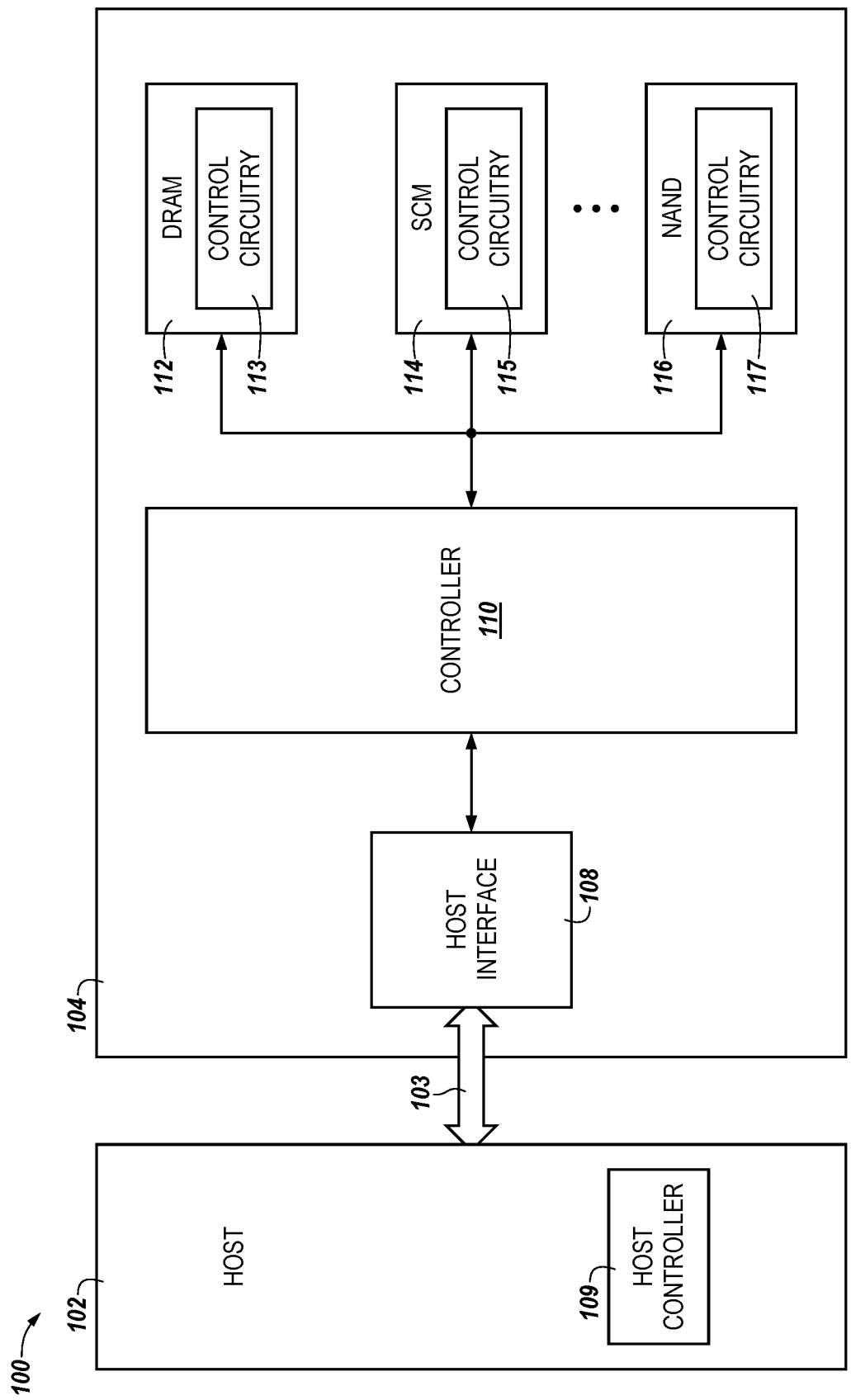
FIG. 1 is a functional block diagram in the form of a computing system including an apparatus including a memory system in accordance with a number of embodiments of the present disclosure.

Systems, apparatuses, and methods related to media type selection are described. Memory systems can include multiple types of memory media (e.g., volatile and/or non-volatile) and can write data to the various memory media types. The data inputs that can be written to memory media can vary based on characteristics such as source, attributes, metadata, and/or information included in the data. Data inputs received by a memory system can be written (e.g., stored) in a particular type of memory media based on attributes. For instance, a particular memory media type can be selected from multiple tiers of memory media types based on characteristics of the memory media type and the attributes of the data input. Characteristics of the memory media type can include volatility, non-volatility, power usage, read/write latency, footprint, resource usage, and/or cost. In an example, a method can include receiving, by a memory system that comprises a plurality of memory media types, data from at least one of a plurality of sensors, identifying one or more attributes of the data; and selecting, based at least in part on the one or more attributes of the data, one or more of the memory media types to write the data to.

A computing system including memory systems can include one or more different memory media types which can be used to store (e.g., write) data in a computing system. Such data can be transferred between a host associated with the computing system and the memory system. The data stored in memory media can be important or even critical to operation of the computing system and/or the host. There are various types of memory media and each type of memory media includes characteristics that may be unique to the memory media type.

For example, non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data (e.g., host data, error data, etc.) and includes random-access memory (RAM), dynamic random access memory (DRAM), and static random access memory (SRAM), among others. The characteristics of different memory media types can include features that cause tradeoffs related to performance, storage density, energy requirements read/write speed, cost, etc. In some examples, some memory media types may be faster to read/write but less cost effective than other memory media types. In other examples, memory media types may be faster but consume a large amount of power and reduce the life of a battery, other memory media types can be slower consume less power.

As hosts such as mobile devices, semi-autonomous vehicles, fully autonomous vehicles, mobile artificial intelligence systems, etc. become more prevalent, sensors and other devices related to computing systems and hosts are also increasingly prevalent. The sensors can produce frequent and/or large quantities of data which can be used by a computing system, a host, and/or a user interface corresponding to a host, to make decisions related to the operation of the host. Balancing the tradeoffs between various different memory media types to store the frequent and/or large quantities of data can be an important endeavor. Particularly, when large quantities and/or frequent data inputs are generated, they require quick decisions related to an operation of a host device.

In some approaches, data may be written (e.g., stored) to a memory system based on an order in which the data arrives from an origin or by another predetermined schema and is automatically written to a particular memory media type. This approach can cause the retrieval or interpretation of the data to be slow, ineffective, costly, and/or otherwise waste resources of the computing system (e.g., host). As a result, the tradeoffs of a computing system writing data to particular memory media types can become more pronounced. Said differently, writing data according to a predetermined schema can result in non-important data occupying space in a memory media type that is better suited for important (e.g., critical) data, and critical data may be confined to a media type that is slower to access. This can lead to inefficient operation of the host and/or error in retrieving critical data from memory media on the memory system.

As mentioned, host devices can include communicatively coupled devices (e.g., sensors) which may be intermittently or consistently generating data to be written (e.g., stored) to memory media of a memory system. As storage capability of memory systems increase, and the volume of generated data increases, and the effects of inefficient data storage becomes more pronounced. These effects can be further exacerbated by the limitations of some approaches to read and interpret data such that the contents can be effective, especially as the amount of data stored in memory systems and the speed at which data retrieval is expected.

In contrast, embodiments herein are directed to storing (e.g., writing) data generated from devices communicatively coupled to a memory system (e.g., sensors generating data) based on attributes of the device generating the data, a context of the host device, information included in the data, information included in the data compared to a baseline, or combinations thereof. Storing (e.g., writing) data based on attributes can determine an appropriate memory media type to best utilize resources (e.g., power, space, cost, etc.) Using attributes and information related to the data and the attributes, a rank can be assigned to the data, and the data can be stored in a memory media type based on the rank of the data. For example, in a context of mobile devices and/or partially or fully autonomous vehicles, decisions related to data received from sensors may need to be made quickly, and latency in retrieval can be undesirable. In such examples, data requiring quick decisions may be ranked higher and written to a memory media including quick retrieval features (e.g., DRAM). In contrast, data received from a sensor that is determined not to require a quick decision can be ranked lower and stored in a memory media having a slower retrieval speed (e.g., NAND). The terms "high" and "low" can refer to a threshold that can be pre-established or machine learned.

As used herein, the term "attribute" refers to metrics of a device generating the data. For example, an attribute of data can refer to a device (e.g., sensor) or a type of device (e.g., a camera) that generated the data to be stored in the memory media. In other words, an attribute of the data can refer to a characteristic of the device (e.g., sensor) that generated the data (e.g., a location on the host or positional information). As used herein, the terms "information included in/about the data" and/or "information about the attribute" refers to the contents of the data (e.g., a tree within an image, an audio recording, a video recording, a temperature, etc.), metadata (e.g., time, date, GPS location, etc.), or a context of the host corresponding to the sensor generating the data (e.g., a sensor on a vehicle having forward velocity). The information about the data/attribute can be compared to baseline information, and the comparison can be used to determine which memory media type should be used to store the data.

The selection of a memory media type from a multiple memory media types, of which to store the data received, can be made by a memory system controller and/or a host controller. A memory system controller can be a controller or other circuitry which is coupled to the memory system. The memory system controller can include hardware, firmware, and/or software to determine attributes and information about the incoming data and select a memory media type to write the data. A host controller can be a controller or other circuitry which can be communicatively coupled to the memory system to determine attributes and information about the incoming data and select a memory media type to write the data.

Embodiments herein can allow a memory system including multiple memory media types to selectively determine which memory media type is appropriate for the incoming data, based at least in part, on attributes of the data, a context of the host, information included in the data, a comparison of the data to baseline data, or a combination thereof. As will be described herein, in some embodiments, data previously written to a particular memory media type can be transferred to a different memory media type, based on time, incoming data, a change in context of the host, etc.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "J," "K," "L," "N," "R," "Q," etc., particularly with respect to reference numerals in the drawings, indicate that a number of the particular feature so designation can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context and, unless stated otherwise, can include a wireless connection. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 106 can reference element "06" in FIG. 1, and a similar element can be referenced as 206 in FIG. 2. A group or plurality of similar elements or components can generally be referred to herein with a single element number. For example, a plurality of reference elements 230-1, . . . , 230-N (e.g., 230-1 to 230-P) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, e.g., a processor, control circuitry, hardware, firmware, and/or software and a number of memory media devices each including control circuitry.

FIG. 1 illustrates a non-limiting example of multiple memory media types in the form of a DRAM 112 including control circuitry 113, SCM 114 including control circuitry 115, and a NAND 116 including control circuitry 117. While three memory media types (e.g., DRAM 112, SCM 114, and NAND 116) are illustrated, embodiments are not so limited, however, and there can be more or less than three memory media types. Further, the types of memory media are not limited to the three specifically illustrated (e.g., DRAM 112, SCM 114, and NAND 116) in FIG. 1, other types of volatile and/or non-volatile memory media types are contemplated. In a number of embodiments, the controller 110, the memory media DRAM 112, SCM, 114, and NAND 116, and/or the host interface 108 can be physically located on a single die or within a single package, e.g., a managed memory application. Also, in a number of embodiments, a memory, e.g., memory media DRAM 112, SCM, 114, and NAND 116, can be included on a single memory system 104.

As illustrated in FIG. 1, the controller 110 can be coupled to the host interface 108 and to the memory media DRAM 112, SCM, 114, and NAND 116 via one or more channels and can be used to transfer data between the memory system 104 and a host 102 having a host controller 109. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The host 102 can be a host system such as a personal laptop computer, a vehicle, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, sensors, actuators, and/or network connectivity which enable such devices to connect to a network and/or exchange data. Examples of IoT enabled devices include mobile phones, smart phones, tablets, phablets, computing devices, implantable devices, vehicles, home appliances, smart home devices, monitoring devices, wearable devices, devices enabling intelligent shopping systems, among other cyber-physical systems.

In some embodiments, the host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

The computing system 100 can include separate integrated circuits or the host 102, the memory system 104, the host interface 108, the controller 110, and/or the memory media DRAM 112, SCM, 114, and/or NAND 116 can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

Although not illustrated in FIG. 1 as to not obscure the examples of the disclosure, the memory system 104 can be communicatively coupled (e.g., connected) to sensors which can be communicatively coupled to the host 102. As used herein, the term "sensor" refers to a device that can generate and send data and/or receive data. Some examples of sensors can include temperature devices, camera devices, video devices, audio devices, motion devices, Internet of Things (IoT) enabled devices (e.g., vehicle electronic control unit (ECU) devices, thermostats, bulbs, locks, security systems, toothbrushes, pet feeders, etc.), among others. The sensors may transmit data for storage in the memory system 104. For example, the controller 110 can be coupled to a plurality of memory media types (e.g., the memory media DRAM 112, SCM, 114, and NAND 116) to receive data from the plurality of sensors.

The controller 110 (and/or the host controller 109) can receive data multiple times from an individual sensor, or from multiple sensors. The sensors may have multiple functionalities and transmit data having more than one type of information. For example, one or more of the sensors can include acoustic (e.g., a microphone, etc.) functionality, video functionality, or both and be communicatively coupled to the host 102. The controller 110 can identify information about one or more attributes of the data. For example, the controller 110 can identify a particular sensor that transmitted the data, the contents of the data, an operation of the host 102 at the time the data was transmitted, etc. The controller 110 can select, based at least in part on the identified information about the one or more attributes, a memory media type of the plurality of memory media types (e.g., memory media DRAM 112, SCM, 114, and NAND 116) and write the data to the selected memory media type. Further, the memory media types (e.g., memory media DRAM 112, SCM, 114, and NAND 116) can be communicatively coupled to each other such that data can be transferred between the memory media.

The selection of the memory media type can be based in part on a rank assigned to the data by the controller 110. The assigned rank can be based at least in part on the information about the data and/or the one or more attributes within a context of the host. In some examples, the context can be an operation of the host. For example, in some embodiments, the host 102 can be a vehicle and the attributes of the data are related to a position and/or a function of each of a plurality of sensors respective to the host 102 (e.g., the vehicle) communicatively coupled to the controller 110. For example, the higher data is ranked, the faster it may need to be accessed by the computing system 100.

In an embodiment where the vehicle is moving forward, camera data transmitted to the controller 110 from a sensor located in the front portion of the vehicle may be ranked higher than camera data from a sensor located at a rear portion of the vehicle. In this example, the data received from the front portion sensor may be ranked higher than the data received from the rear portion of the vehicle. The data from the front portion of the vehicle may be written into the DRAM 112 because is faster than other types of memory media. The data from the rear portion of the vehicle may be written to the SCM 114 or the NAND 116 because it is not as relevant to the context (e.g., the forward motion) of the host 102 (e.g., the vehicle) and thus ranked lower. In some examples, the controller 110 can compare the received data to reference data related to the sensor.

For example, the controller 110 may receive data from a sensor of the plurality of sensors coupled to the host 102. The controller can compare the received data from the sensor to reference data (corresponding to the same sensor) stored by a memory media type (e.g., SCM 114 or NAND 116). The controller 110 can identify differences between the received data and the reference data and assign a rank to the received data based at least in part on the identified differences. An indication of differences in the received data and the reference data can indicate that the received data should be stored in a memory media type that is quickly accessible (e.g., DRAM 112). In contrast, when no differences between the received data and the reference data are identified, the controller 110 may store the received data in a memory type that is not as quickly accessible.

For example, the controller 110 can write the received data in a first memory media type (e.g., DRAM 112) of the plurality of memory media types (e.g., memory media DRAM 112, SCM, 114, and NAND 116) responsive to the comparison indicating differences between the received data and the reference data. Such differences may indicate that the senor has detected a change in the environment of the host, and a decision may need to be quickly made. In contrast, the controller 110 can write the received data in a second memory media type (e.g., SCM 114 or NAND 116) of the plurality of memory media types (e.g., memory media DRAM 112, SCM, 114, and NAND 116) responsive to the comparison indicating that the received data and the reference data is the same, where the first memory media type is volatile and can be accessed quickly, and the second memory media type is non-volatile and may be slower to access.

Figure 2:
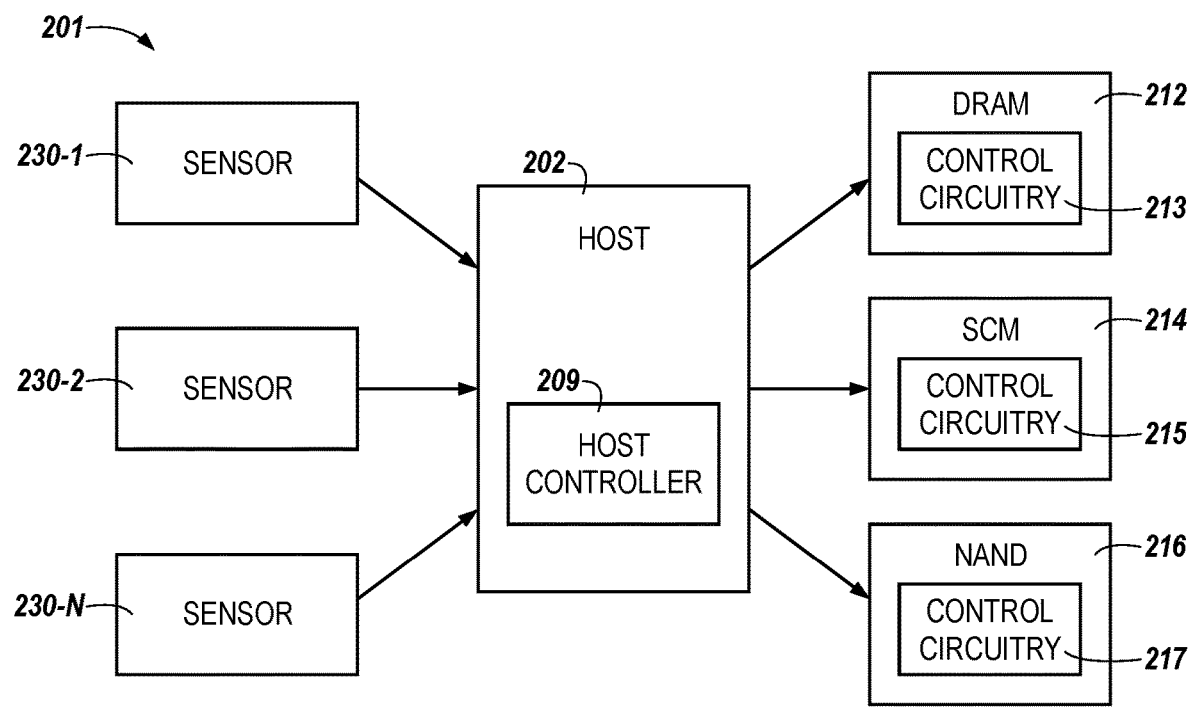
FIG. 2 is a functional block diagram in the form of a computing system including multiple memory media types in accordance with a number of embodiments of the present disclosure.

FIG. 2 is a functional block diagram in the form of a computing system 201 including multiple memory media types in accordance with a number of embodiments of the present disclosure. FIG. 2 illustrates a computing system 201 which includes a host 202, including a host controller 209 which can be analogous to the host 102 and host controller 109 described in connection with FIG. 1. Although not illustrated in FIG. 2 as to not obstruct the examples of the disclosure, computing system 201 can include a controller (e.g., controller 110 described in connection with FIG. 1). The computing system 201 can include sensors 230-1, 230-2, and 230-N, which may be generally referred to herein as the sensors 230.

The host 202 can be communicatively coupled to the sensors 230 via a physical connection (e.g., via wiring, circuitry, etc.) or remotely coupled (e.g., via a wireless signal, near field communication, Bluetooth, Bluetooth Low Energy, RFID, etc.). The host 202 can be communicatively coupled to one or more memory media types. FIG. 2 illustrates a non-limiting example of multiple memory media types in the form of a DRAM 212 including control circuitry 213, SCM 214 including control circuitry 215, and a NAND 216 including control circuitry 217. The host 202 can receive data generated from one or more of the sensors 230.

The embodiment illustrated in FIG. 2 illustrates an example of the sensors 230 transmitting data to the host 202 having a host controller 209, where the host controller 209 receives data from one or more of the sensors 230 and determines a rank of the data received. Based on the determined rank, the host controller 209 can determine which memory media type (e.g., DRAM 212, SCM 214, and/or NAND 216) is the most appropriate to write the data to. Embodiments described in connection with FIG. 2 are not so limited, however, examples described in connection with FIG. 2 can be accomplished with a memory system controller analogous to the controller 110 of FIG. 1.

The host controller 209 can receive data from at least one sensor of the sensors 209, identify one more attributes about the data, and select one or more of the memory media types (e.g., DRAM 212, SCM 214, and/or NAND 216) to write the data to, based on the identified attributes. For example, the host controller 209 can receive data from a first sensor 230-1 of the plurality of sensors 230 and identify information about one or more attributes of the data from the first sensor 230-1. Attributes of the data received from the first sensor 230-1 can be a type of sensor or a location of the sensor 230-1 relative to the host 202 (e.g., data received from a camera sensor located on the front of a host vehicle). Information about the attributes of the data from the first sensor 230-1 can include a time received, images captured from the first sensor 230-1, etc.

The host controller 209 can receive data from any of the sensors 230 separately or concurrently. For example, the host controller 209 can receive data from a second sensor 230-2 of the plurality of sensors 230, separately or concurrent with the data received from the first sensor 230-1, and identify information about one or more attributes about the data from the second sensor 230-2. Attributes of the data received from the second sensor 230-2 can be a type of sensor or a location of the sensor 230-2 relative to the host 202 (e.g., data received from a camera sensor located on the rear of a host vehicle). Information about the attributes can include metrics such as can include a time received, images captured from the second sensor 230-2, etc. The host controller 209 can determine a rank of the data received from the first sensor 230-1 and the data received from the second sensor 230-2.

For example, the host controller 209 can determine, based on the identified information about the one or more attributes from the first sensor 230-1 and the second sensor 230-2, a rank of the information corresponding to the first sensor 230-1 and the second sensor 230-2. For example, in embodiments where the host 202 is a vehicle, and the vehicle is moving forward, the data from the first sensor 230-1 (e.g., image from a camera sensor located on the front of the vehicle) can be ranked higher than the data from the second sensor 230-2 (e.g., image from a camera sensor located on the rear of the vehicle). However, in embodiments where the host 202 is a vehicle, and the vehicle is moving in reverse, the data from the first sensor 230-1 (e.g., image from a camera sensor located on the front of the vehicle) can be ranked lower than the data from the second sensor 230-2 (e.g., image from a camera sensor located on the rear of the vehicle). In other words, in embodiments herein, the ranking can be dependent in part on a context of the host 202. The host controller 209 can determine a memory media type to store the data based at least in part on the rank.

For example, the host controller 209 can select the memory media type (e.g., DRAM 212, SCM 214, and/or NAND 216) to write the data from the first sensor 230-1 and the second sensor 230-2, where the memory media type selected depends on the determined rank of the information corresponding to the first sensor 230-1 and the second sensor 230-2. Specifically, the host controller 209 can store the data having the higher rank in memory media that has characteristics related to fast accessibility (e.g., DRAM 212) because the higher ranked data is more important to the context of the host 202. In other embodiments, the host controller 209 can receive more than one portion of data from an individual sensor 230.

The host controller 209 can receive a first portion of data from a sensor 230-N of the plurality of sensors 230 and identify information about one or more attributes of the first portion of data from the sensor 230-N. In this example, the attributes of the sensor 230-N can be a type and location of the sensor 230-N relative to the host 202 (e.g., a video sensor located on a rear portion of a host vehicle), and information about the one or more attributes of the data can include such metrics as a time the first portion of data was captured, a context of the vehicle at the time the first portion was captured, images included in the first portion of data, etc. The host controller 209 can receive a subsequent portion of data from the sensor 230-N.

For example, the host controller 209 can receive a subsequent portion of data from the sensor 230-N and identify information about one or more attributes of the subsequent portion of data from the sensor 230-N. In this example, the attributes can be the same attributes corresponding to the first portion of data (e.g., a video sensor located on a rear portion of a host vehicle) because the first portion of data and the subsequent portion of data were generated by the same sensor 230-N. However, the information about the attributes of the subsequent portion of data may be different from the first portion of data. For example, the information of the subsequent portion of data may include images that were captured at a different time, or the host 202 (e.g., the vehicle) may have changed a context. The host controller 209 can rank the first portion of data and the second portion of data based on the information about the attributes of the sensor 230-N that generated the data.

Continuing with the previous example, the host controller 209 can determine, based on the identified information about the one or more attributes of the first portion of data and the subsequent portion of data received from the sensor 230-N, a rank of the first portion of data and the subsequent portion of data. The first portion of data the subsequent portion of data can be the same or different. The host controller 209 can select the memory media type (e.g., DRAM 212, SCM 214, and/or NAND 216) to write the first portion of data and the subsequent portion of data from the sensor 230-N, where the memory media type selected depends on the determined rank of the information corresponding to the first portion of data and the subsequent portion of data.

For example, the host controller 209 can select a first memory media type DRAM 212 to write a first portion of data received from sensor 230-N and select a second memory media type SCM 214 to write the subsequent portion of data received from the sensor 230-N, where the first memory media type DRAM 212 and the second memory media type SCM 214 are different and selected based on a determined rank of the first and the subsequent portions of the data. In other words, the portion of the data that is determined to be the highest ranked (e.g., the most important or most relevant to the host 202) can be stored in a place that is more quickly accessible (e.g., DRAM 212) and the lower ranked (e.g., not relevant or important to the host 202) can be stored in a memory media that is slower to access (e.g., SCM 214 or NAND 216).

Figure 3:
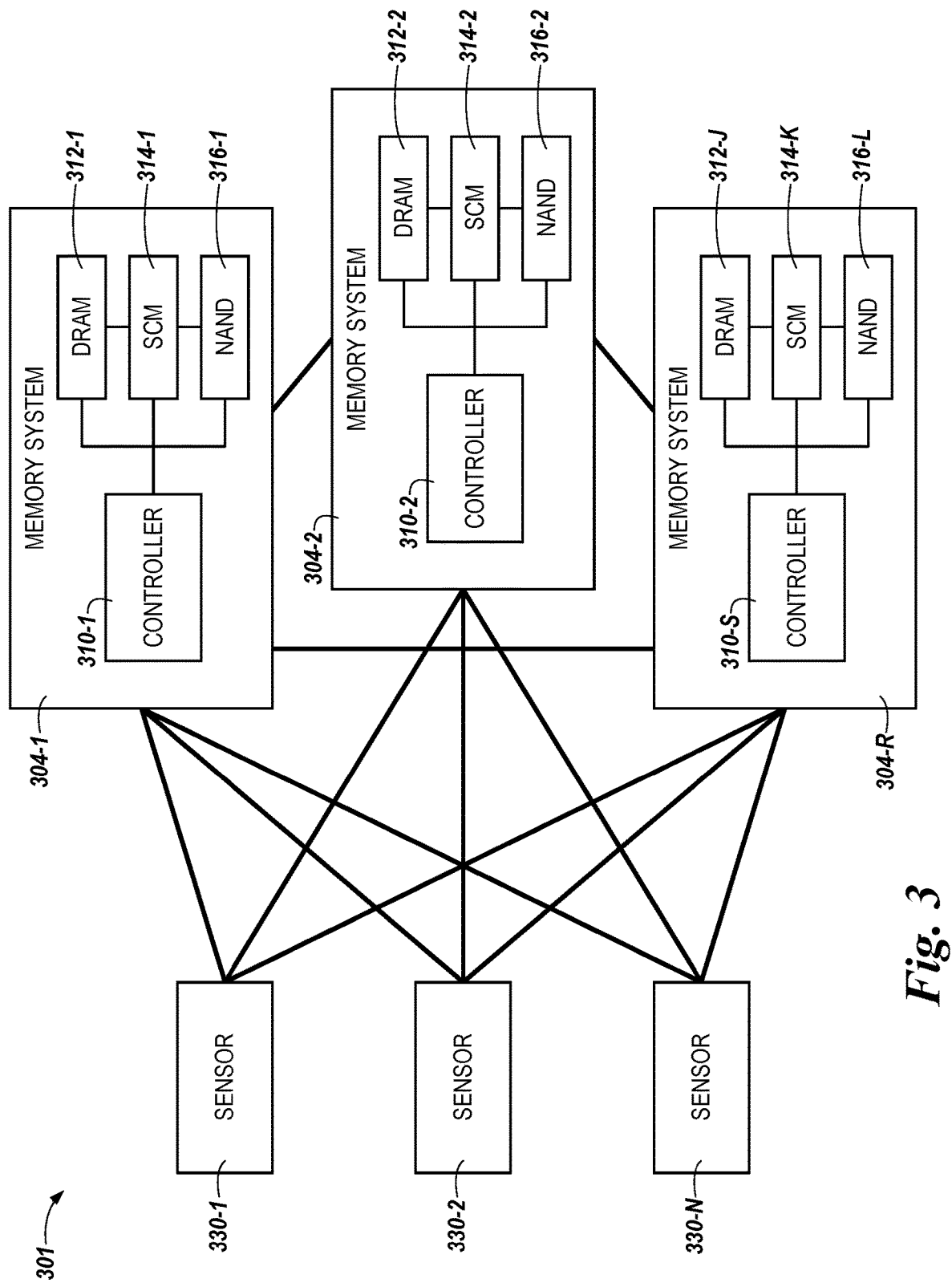
FIG. 3 is functional block diagram in the form of a computing system including multiple memory media types in accordance with a number of embodiments of the present disclosure.

FIG. 3 is functional block diagram in the form of a computing system 301 including multiple memory media types in accordance with a number of embodiments of the present disclosure. The embodiment illustrated in FIG. 3 illustrates a memory system 301 including sensors 330-1, 330-2, 330-N which can be collectively referred to herein as the sensors 330 and be analogous to the sensors described in connection with FIG. 2. The computing system 301 can include multiple memory systems 304-1, 304-2, 304-R which can be collectively referred to herein as memory systems 304 and be analogous to the memory system 104 described in connection with FIG. 1. Each of the memory systems 304 can respectively include a controller 310-1, 310-2, and 310-S, and be collectively referred to herein as controllers 310 and be analogous to the controller 110 described in connection with FIG. 1. Each of the controllers 310 can be communicatively coupled to memory media types (e.g., various types of volatile and/or non-volatile memory).

Memory system 304-1 can include controller 310-1 and memory media types DRAM 312-1, SCM 314-1, and NAND 316-1. Memory system 304-2 can include controller 310-2 and memory media types DRAM 312-2, SCM 314-2, and NAND 316-2. Memory system 304-R can include controller 310-S and memory media types DRAM 312-J, SCM 314-K, and NAND 316-L. Embodiments are not so limited, however, and each memory system 304 can include any number and combination of memory media types.

The embodiment of FIG. 3 illustrates an example of a computing system 301 in which each sensor 330 is communicatively coupled to each memory system 304, and each memory system 304-1, 304-2, and 304-R are communicatively coupled to each other. Although not illustrated as to not obscure the examples of the disclosure, the sensors 330 and the memory systems 304 can be communicatively coupled to a host. As will be described in more detail in connection with FIGS. 4 and 5, the memory systems 304 can be included on the host and be portions of ECUs of the host.

In this embodiment, the memory devices 304 may rank data differently based on the ECU to which they correspond.

For example, in a non-limiting embodiment where the host is a vehicle, and a first sensor 330-1 is a camera sensor, a second sensor 330-2 is a temperature sensor, and a third sensor 330-N is acoustic sensor, the memory systems 304 can receive data from all of the sensors 330 and rank the data received from each sensor 330 differently. A first memory system 304-1 may be related to a braking system ECU of the vehicle and may rank data having attributes related to the camera sensor 330-1 higher than sensors related to the temperature sensor 330-2 or the acoustic sensor 330-N. In another example, a second memory system 304-2 may be related to a heating/cooling ECU and may rank data having attributes related to the temperature sensor 330-2 higher than data received from the camera sensor 330-1 or the acoustic sensor 330-N. In yet another example, a third memory device 304-R may be related to an ambient noise ECU and may rank data having attributes related to the acoustic sensor 330-N higher than data from the camera sensor 330-1 or the temperature sensor 330-2.

Each of the controllers 310 can receive data from each of the sensors 330 as the sensors 330 generate the data. Each of the controllers 310 can store the data in a memory media type based on a determined rank or discard the data. For example, the controller 310-1 can receive data from each of the sensors 330-1, 330-2, and 330-N. The controller 310-1 can determine information about attributes of the data, where the attributes of the sensors 330 are related to a function, a location relative to the host, etc. Specifically, the controller 310-1 can receive data from the camera sensor 330-1 and determine the information about the attribute is related to an image included in the data; and determine a rank of the data based at least in part on the image and the function of the sensor 330-1. In this example, the controller 310-1 can write the data received from the sensor 330-1 high and write it to a fast memory media DRAM 312-1. The controller 310-1 can determine that the data received from the temperature sensor 330-2 and the acoustic sensor 330-N does not include information including an image and can rank the data received from sensor 330-2 and sensor 330-N lower than the data received from 330-1 and store it in a slower memory media (e.g., SCM 314-1 or NAND 316-1).

In another example, the controller 310-S can receive data from each of the sensors 330-1, 330-2, and 330-N. The controller 310-S can determine information about attributes of the data, where the attributes are related to an acoustic function of the sensors 330. Specifically, the controller 310-N can receive data from the sensor 330-N (e.g., an acoustic sensor) and determine the information about the attribute is related to audio information included in the data; and determine a rank of the data based at least in part on the audio information and the acoustic function of the sensor 330-N. In this example, the controller 310-S can write the data received from the sensor 330-N high and write it to a fast memory media DRAM 312-J. The controller 310-S can determine that the data received from the camera sensor 330-1 and the temperature sensor 330-2 does not include acoustic information and can rank the data received from 330-1 and 330-2 lower than the data received from 330-N and store it in a slower memory media (e.g., SCM 314-K or NAND 316-L).

Figure 4:
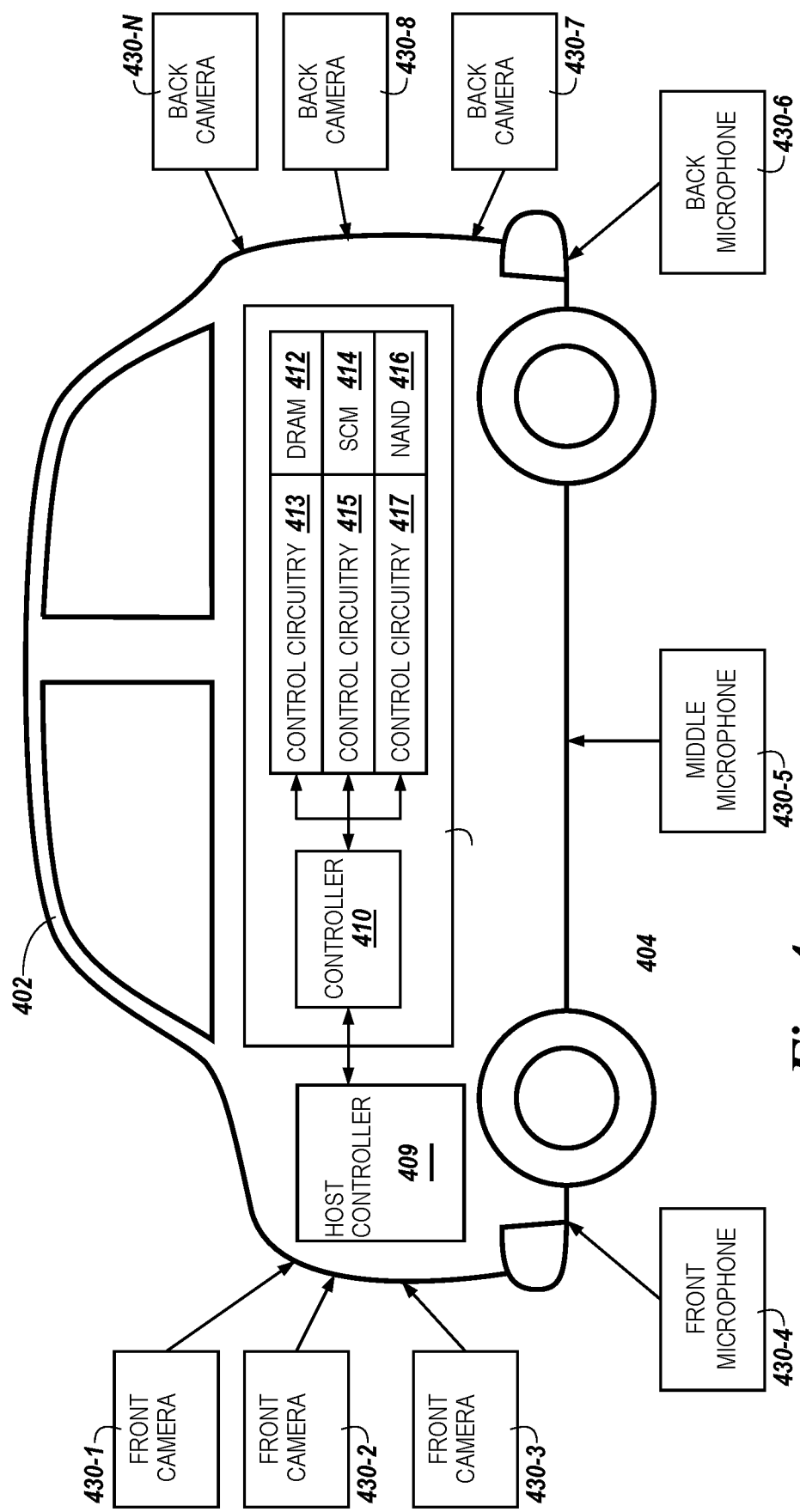
FIG. 4 is a diagram of a memory system including multiple memory media types deployed on a host in the form of a vehicle in accordance with a number of embodiments of the present disclosure.

FIG. 4 is a diagram of a memory system 404 including multiple memory media types deployed on a host 402 in the form of a vehicle in accordance with a number of embodiments of the present disclosure. The host 402 can include a host controller 409 which can be analogous to the host 102 and host controller 109 respectively described in connection with FIG. 1. The host 402 can be communicatively coupled to sensors 430-1, 430-2, 430-3, 430-4, 430-5, 430-6, 430-7, 430-8, 430-N which can be generally referred to as the sensors 430 and be analogous to sensors 230 described in connection with FIG. 2. The host 402 can include a memory system 404 which can be analogous to memory system 104 described in connection with FIG. 1 and include multiple memory media types. The memory system 404 can include a DRAM 412 including control circuitry 413, a SCM 414 including control circuitry 415, and a NAND 416 including control circuitry 417. Embodiments are not so limited, however, and memory system 404 can include any number or combination of memory media types (e.g., non-volatile and/or volatile).

The example host 402 is in the form of a vehicle. A vehicle may include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods. The sensors 430 are illustrated in FIG. 4 as including their attributes. For example, sensors 430-1, 430-2, and 430-3 are camera sensors collecting data from the front of the vehicle host 402. Sensors 430-4, 430-5, and 430-6 are microphone sensors collecting data from the from the front, middle, and back of the vehicle host 402. The sensors 430-7, 430-8, and 430-N are camera sensors collecting data from the back of the vehicle host 402.

The host controller 409 can be a controller designed to assist in automation endeavors of a vehicle host 402. For example, the host controller 409 can be an advanced driver assistance system controller (ADAS). An ADAS can monitor data to prevent accidents and provide warning of potentially unsafe situations. For example, the ADAS may monitor sensors in a vehicle host 402 and take control of the vehicle host 402 operations to avoid accident or injury (e.g., to avoid accidents in the case of an incapacitated user of a vehicle). A host controller 409 such as an ADAS may need to act and make decisions quickly to avoid accidents. The memory system 404 can store reference data in memory media such that new data received from the sensors 430 can be compared to the reference data such that quick decisions can be made by the host controller 409 and/or the controller 410.

The reference data stored in the memory media (e.g., DRAM 412, SCM 414, and/or NAND 416) can be data that the controller 410 and/or the host controller 409 has determined is relevant to the host 402. Reference data may be data aggregated from sensors 430 over a period of time. For example, the reference data associated with the front camera sensors 430-1, 430-2, 430-3 can include data collected of a route frequently traversed by the vehicle host 402. In this way, when the vehicle host 402 is traveling forward, the front camera sensors 430-1, 430-2, and 430-3 can transmit data to the controller 410 and/or the host controller 409. The controller 410 and/or the host controller 409 can compare the new data received to reference data stored and, based on the comparison determine to store the data in a memory media type.

When the newly received data matches that of the reference data, the controller 410 and/or the host controller 409 can determine that that the new data may not need to be quickly accessible and can write the new data to SCM 414 and/or NAND 416. When the newly received data does not match the reference data, the controller 410 and/or the host controller 409 can determine to store the data in memory media that can be quickly accessed (e.g., DRAM 412) such that the controller 410 and/or the host controller 409 can make decisions that may impact the operation of the vehicle host 402.

The controller 410 and/or the host controller 409 can receive data from all of the sensors 430. Depending on the operation of the vehicle host 402, the controller 410 and/or the host controller 409 can rank the data received from the sensors 430. For example, when the vehicle host 402 is moving forward, the controller 410 and/or the host controller 409 can rank the data received from the front camera sensors 430-1, 430-2, 430-3 and the microphone sensor 430-4 higher than the data collected from the middle microphone sensor 430-5, back microphone sensor 430-6, and back camera sensors 430-7, 430-8, and 430-N. Likewise, when the host vehicle 402 is moving in reverse, the controller 410 and/or the host controller 409 can rank the data received from the front camera sensors 430-1, 430-2, 430-3 and the microphone sensor 430-4 lower than the data collected from the middle microphone sensor 430-5, back microphone sensor 430-6, and back camera sensors 430-7, 430-8, and 430-N. The context of the vehicle host 402 can impact how data is ranked by the controller 410 and/or the host controller 409 such that the data can be prioritized for comparison to reference data and stored in appropriate memory media. Embodiments are not so limited, however, and other hosts and context of hosts are contemplated.

Figure 5:
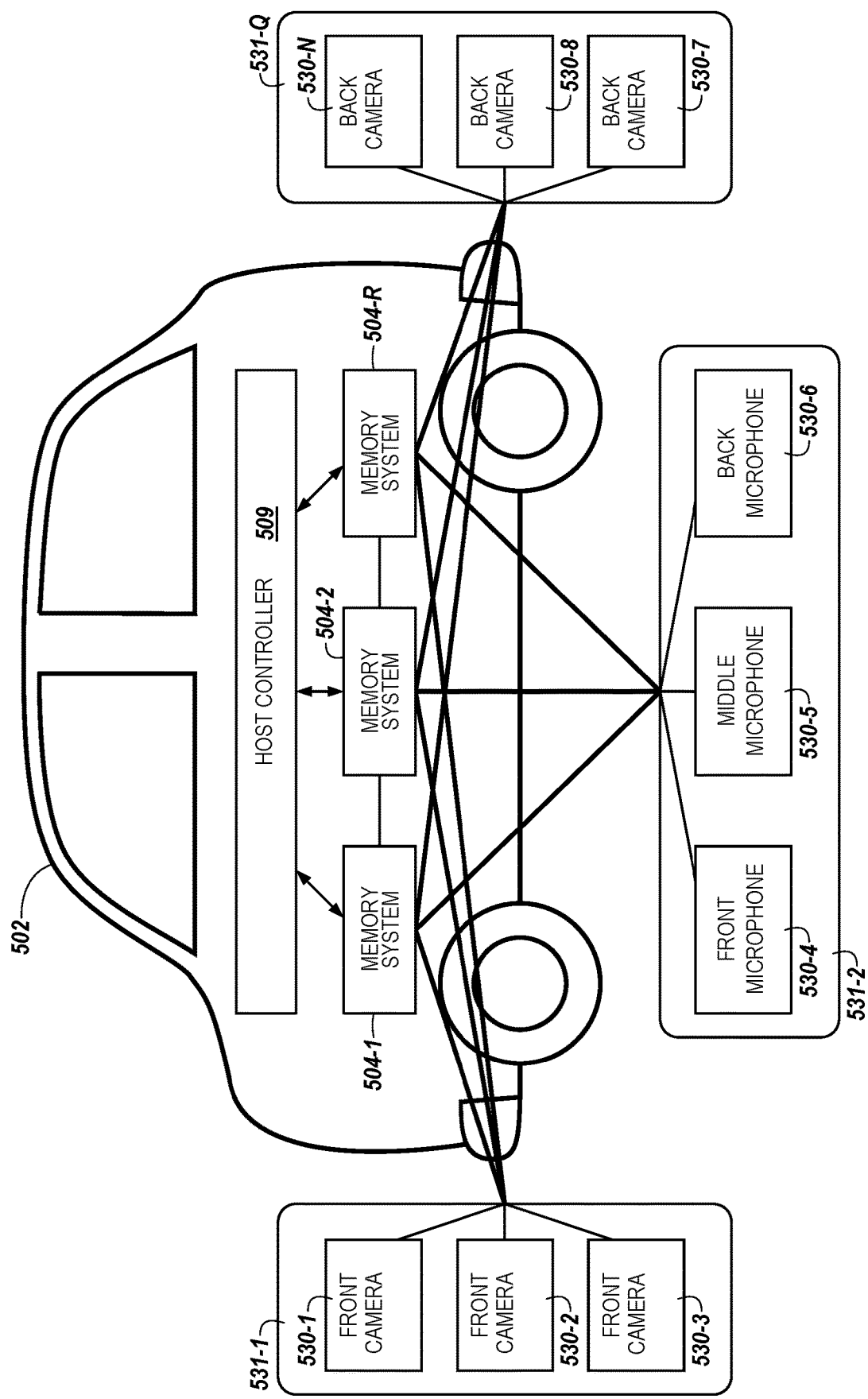
FIG. 5 is a diagram of a plurality of memory systems deployed on a host in the form of a vehicle in accordance with a number of embodiments of the present disclosure.

FIG. 5 is a diagram of a plurality of memory systems 504-1, 504-2, and 504-R deployed on a host 502 in the form of a vehicle in accordance with a number of embodiments of the present disclosure. The host 502 can include a host controller 509 which can be analogous to the host 102 and host controller 109 respectively described in connection with FIG. 1. The host 502 can be communicatively coupled to sensors 530-1, 530-2, 530-3, 530-4, 530-5, 530-6, 530-7, 530-8, and 530-N which can be collectively referred to as the sensors 530 and can be analogous to the sensors 230 described in connection with FIG. 2. The host 502 can include memory systems 504-1, 504-2, and 504-R which can be generally referred to as memory systems 504 and be analogous to memory system 104 described in connection with FIG. 1.

Although not illustrated in FIG. 5, as to not obscure the examples of the disclosure, each of the memory systems 504 can include multiple memory media types (e.g., DRAM 112, SCM 114, and/or NAND 116 described in connection with FIG. 1), and one or more memory controllers (e.g., the controller 110 described in connection with FIG. 1). Embodiments are not so limited, however, and memory system 504 can include any number or combination of memory media types (e.g., non-volatile and/or volatile).

The example host 502 is in the form of a vehicle. As mentioned above, a vehicle may include a car (e.g., sedan, van, truck, etc.), a connected vehicle (e.g., a vehicle that has a computing capability to communicate with an external server), an autonomous vehicle (e.g., a vehicle with self-automation capabilities such as self-driving), a drone, a plane, and/or anything used for transporting people and/or goods. The sensors 530 are illustrated in FIG. 5 as including their attributes. For example, sensors 530-1, 530-2, and 530-3 are camera sensors collecting data from the front of the vehicle host 502. Sensors 530-4, 530-5, and 530-6 are microphone sensors collecting data from the from the front, middle, and back of the vehicle host 502. The sensors 530-7, 530-8, and 530-N are camera sensors collecting data from the back of the vehicle host 502.

The sensors 530 can be grouped by their attributes. For example, the front camera sensors 530-1, 530-2, and 530-3 can be grouped together as front camera sensors 531-1. The microphone sensors 530-4, 530-5, and 530-6 can be grouped together as microphone sensors 531-2. The back camera sensors 530-7, 530-8, and 530-N can be grouped together as back camera sensors 531-Q.

The host controller 509 can be a controller designed to assist in automation endeavors of a vehicle host 502. For example, the host controller 502 can be an advanced driver assistance system controller (ADAS). An ADAS can pre-emptively monitor data to prevent accidents and provide warning of potentially unsafe situations.

For example, the ADAS may monitor sensors in a vehicle host 502 and take control of the vehicle host 502 operations to avoid accident or injury. A host controller 409 such as an ADAS may need to act and make decisions quickly to avoid accidents. The memory systems 504 can store reference data in memory media such that new data received from the sensors 530 can be compared to the reference data such that quick decisions can be made by the host controller 509 and/or memory controllers (e.g., controller 410 of FIG. 4). The memory systems 504 can store reference information for each type of sensor (e.g., camera sensors, video sensors, acoustic sensors, etc.), and/or reference data from multiple types of sensors related to a particular area (e.g., front camera sensors, front acoustic sensors, front video sensors, etc.). In this way, the memory systems 504 can store reference information related to the type of sensor and the location of the sensor. One or more of the memory systems 504 can receive data from each of the sensors 530.

In embodiments where the host controller 509 is a component similar to an ADAS, the operation of some components (e.g., operations) of the vehicle host 502 may be enabled or prevented based on data received from sensors 530. For example, data from the back camera sensors 531-Q can transmit data to the memory systems 504. The information in the data received from the back camera 531-Q may include an image of an object (e.g., a bicycle). The host controller 509 and/or a controller of the memory system 504 can rank this data and write it to a memory media type. In embodiments where the vehicle host is driving forward, the data including information about the image of the bicycle from the back cameras 531-Q may be ranked low. In embodiments where the vehicle host 502 is in reverse, the data including information about the image of the bicycle from the back camera sensors 531-Q may be ranked high (e.g., written to DRAM). Using these methods, the host controller 509 and/or a controller of the memory systems 504, can quickly retrieve the information including information about the image of the bicycle from the back camera sensors 531-Q and compare it to reference information. Based on the comparison, the host controller 509 and/or a controller of the memory system 504 can generate an alert, and/or take measures to prevent the vehicle host 502 from moving.

Each of the memory systems 504 can receive data from each of the sensors 530. In some embodiments, a host 502 can include multiple memory systems 504 and each memory system can correspond to an ECU of the host 502. An ECU may include operations that are relevant only to a portion of the sensors. For example, the memory system 504-1 may include ECU operations for the host 502 the include the front of the host 502. As such, the memory system 504-1 can determine a rank of the data received based on the attributes such that only data from sensors (e.g., the front sensor group 531-1) having attributes relevant to the front of the host 502 are stored. The data received from irrelevant (e.g., non-front sensor group 531-1) can be ranked low and/or discarded.

The plurality of sensors 530 can be communicatively coupled to one or more of the memory systems 504 each having a controller (e.g., the controller 110 described in connection with FIG. 1) coupled to a plurality of memory media types (e.g., the memory media types DRAM 112, SCM 114, and/or NAND 116 described in connection with FIG. 1). Each of the controllers of the memory systems 504 can be configured to receive data from at least one of the plurality of sensors 530 coupled to the host 502 and identify information about one or more attributes of the received data.

The attributes of the data can include a type of sensor of the plurality of sensors that generated the received data. For example, as mentioned herein, the plurality of sensors 530 can include multiple types of sensors. Information about the attributes can include metadata, information about the one or more attributes is information about a time the data is received by the controller, a position of the one or more of the plurality of sensors relative to a host communicatively coupled to the controller, an operation of the host communicatively coupled to the controller, or a combination thereof.

The multiple types of sensors can include image sensors (e.g., the front camera sensors 531-1, and the back camera sensor 531-Q), audio sensors (e.g., the microphone sensors 531-2), video sensors, sensors that are related to ECU of the vehicle (e.g., powertrain sensors, brake sensors, headlight sensors, seatbelt sensors, etc.), or combinations thereof. As mentioned herein, the memory devices 504 can store reference data corresponding to a type or sensor (e.g., reference data for camera sensors) and/or a location of sensor (e.g., sensors located on the front of the host). The memory systems 504 can compare received data from the sensors 504 to reference data. In other words, the controllers for the memory systems 504 can be configured to store reference information for each type of sensor and the stored reference information can be related to the type of sensor and/or the location of the sensor on the host 502.

The controllers of the memory systems 504 can be configured to compare the identified information about the one or more attributes of the received data to reference data corresponding to the plurality of sensors 530. Based on this comparison, the controllers of the memory systems 504 can select a memory media type (e.g., volatile or non-volatile) and write (e.g., store) the received data using the selected memory media type. The memory media type selected can be volatile memory responsive to the determination by the controllers of the memory devices 504 that the reference data and the received data are different. Additionally, the memory media type selected can be non-volatile responsive to the determination by the controllers of the memory devices 504 that the reference data and the received data are the same.

Figure 6:
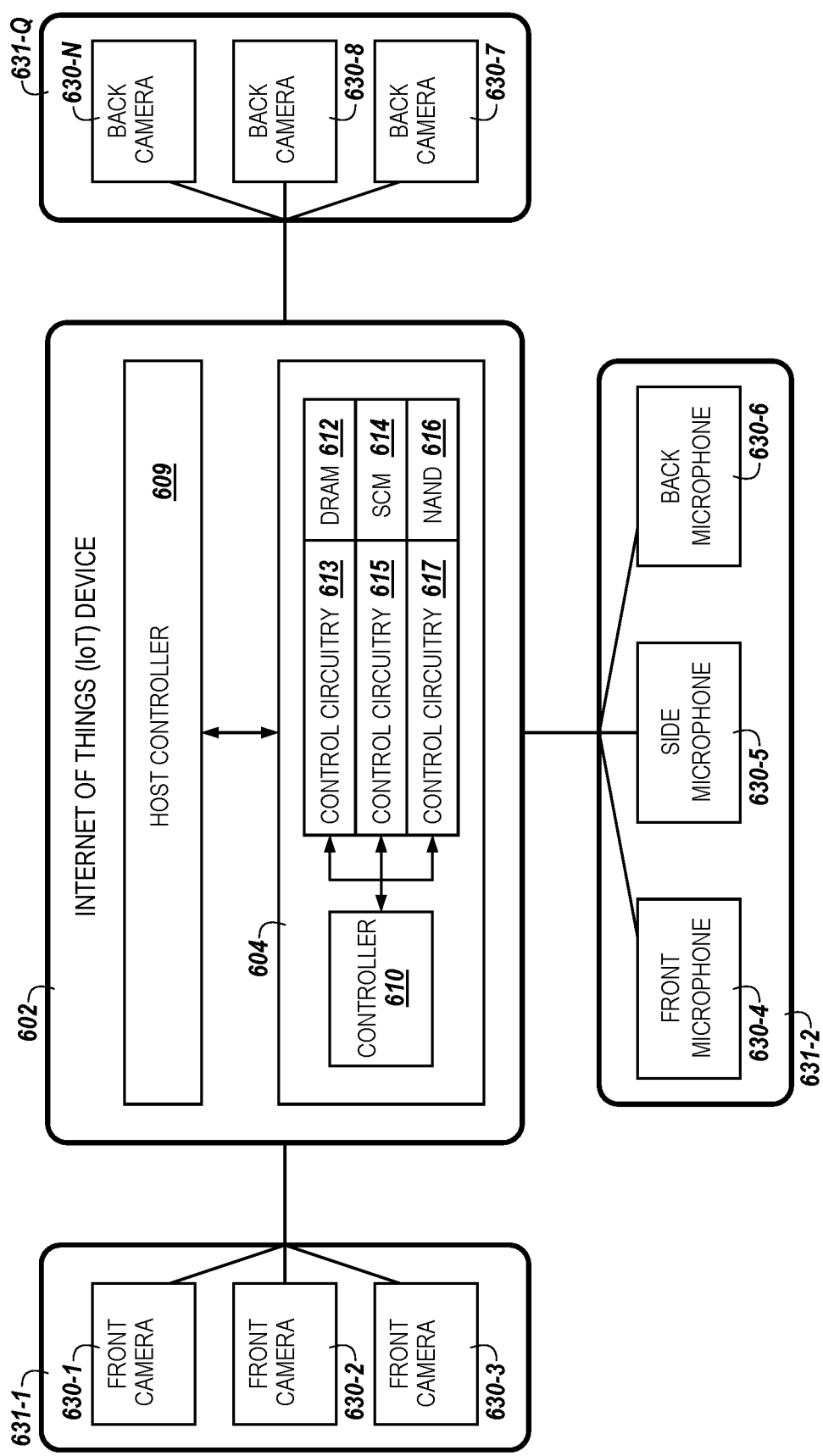
FIG. 6 is a diagram of a memory system including multiple memory media types deployed on a host in the form of an Internet of Things (IoT) device in accordance with a number of embodiments of the present disclosure.

FIG. 6 is a diagram of a memory system 604 including multiple memory media types deployed on a host 602 in the form of an Internet of Things (IoT) device in accordance with a number of embodiments of the present disclosure. The host 602 can include a host controller 609 which can be analogous to the host 102 and host controller 109 respectively described in connection with FIG. 1. The host 602 can be communicatively coupled to sensors 630-1, 630-2, 630-3, 630-4, 630-5, 630-6, 630-7, 630-8, 630-N which can be generally referred to as the sensors 630 and be analogous to sensors 230 described in connection with FIG. 2. The host 602 can include a memory system 604 which can be analogous to memory system 104 described in connection with FIG. 1 and include multiple memory media types. The memory system 604 can include a DRAM 612 including control circuitry 613, a SCM 614 including control circuitry 615, and a NAND 616 including control circuitry 617. Embodiments are not so limited, however, and memory system 604 can include any number or combination of memory media types (e.g., non-volatile and/or volatile).

The example host 602 is in the form of an IoT device (e.g., IoT enabled devices). An IoT enabled device can include mobile phones, smart phones, tablets, phablets, computing devices, implantable devices, vehicles, home appliances, smart home devices, monitoring devices, wearable devices, devices enabling intelligent shopping systems, among other cyber-physical systems. The sensors 630 can include multiple types of sensors located on the IoT device host 602. A type of sensor can refer to an attribute (e.g., image/camera sensors, audio/acoustic/microphone sensors, video sensors, motion sensors, ECU sensors, or combinations thereof.

The type of sensors can also refer to a location on the host 602. For example, a type of sensor can refer to all sensors related to the front of the host 602, the side of the host, 602, the back of host 602 etc. The types of sensors can further be grouped according to the operation attribute and the locations. The sensors 630 are illustrated in FIG. 6 as including their operation attribute and/or the locations relative to the host 602. For example, sensors 630-1, 630-2, and 630-3 are camera sensors collecting data from the front of the host 602 and are grouped as front camera sensors 631-1. Sensors 630-4, 630-5, and 630-6 are microphone sensors collecting data from the from the front, side, and back of the host 602 are grouped as microphone sensors 631-2. The sensors 630-7, 630-8, and 630-N are camera sensors collecting data from the back of the host 602 and are grouped as back camera sensors 631-Q.

The host controller 609 can be a controller designed to assist in the processing of applications for the host 602. For example, the host controller 609 can be a processing resource to execute instructions to operate applications of the host 602. A processing resource can monitor data either stored as reference data or as new data generated by the sensors 630. The data generated by the sensors 630 can affect different host 602 applications. The processing resource can monitor the received data and interpret comparisons between the received data and the reference data to prevent error, wasted resources, and provide warning of potentially unsafe situations. The host controller 609 and/or the controller 610 can determine an operation of the host 602. The operation (e.g., the context) of the host 602 can affect the rank of the data received from the sensors 602.

For example, the host controller 609 and/or the controller 610 may monitor sensors in the host 602 to determine a context of the host 602 and rank data generated by the sensors 630 based on the determined context. A host controller 609 and/or the controller 610 may need to act and make decisions quickly to avoid prevent error or improve the operation of the applications executed on the host 602.

In an example embodiment, the host controller 609 and/or the controller 610 can determine, responsive to receiving data from at least one of a plurality of sensors, an operation of the memory system 604 (e.g., an operation of the host 602). For example, the host 602 may be a mobile device (e.g., a smart phone) and the host controller 609 and/or the controller 610 may be executing operations using the front of the phone are used (e.g., front display pressure, video phone calls, etc.). The host controller 609 and/or the controller 610 can assign a rank to the data based on the on the determined operation of the memory system 604.

In other words, because the memory system 604 is indicating that the front of the mobile device host 602 is being used, the front facing sensors (e.g., 630-1, 630-2, 630-3, and/or 630-4) can be ranked higher than other sensors (e.g., 630-5, 630-6, 630-7, 630-8, and 630-N. Based on the rank, data may be stored in memory media (e.g., DRAM 612, SCM 614, and/or NAND 616), or the data can be discarded and not stored if the host controller 609 and/or the controller 610 determines that the data is sufficiently irrelevant. The host controller 609 and/or the controller 610 can discard the data (e.g., the data from the back sensors 631-Q) based on the assigned rank and the operation of the memory system (e.g., indicating that the host 602 is using features on the front of the mobile device).

Figure 7:
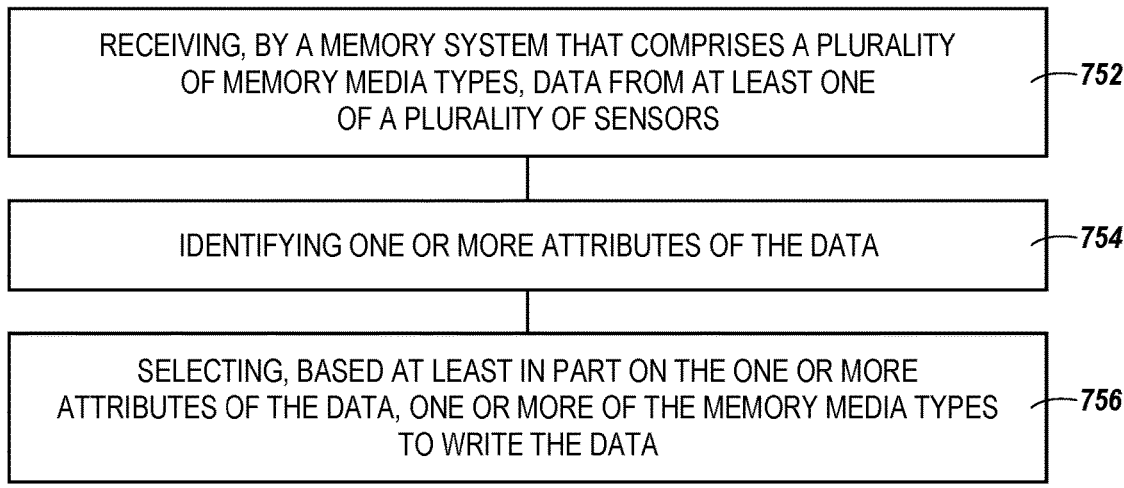
FIG. 7 is a flow diagram representing an example method for media type selection in accordance with a number of embodiments of the present disclosure.

FIG. 7 is a flow diagram representing an example method 750 for media type selection in accordance with a number of embodiments of the present disclosure. At block 752, the method 750 can include receiving, by a memory system (e.g., the memory system 100 described in connection with FIG. 1) that comprises a plurality of memory media types (e.g., DRAM 112, SCM 114, and/or NAND 116 described in connection with FIG. 1), data from at least one of a plurality of sensors (e.g., sensors 230 described in connection with FIG. 2). The sensors may have multiple functionalities and transmit data having more than one type of information. For example, one or more of the sensors can include acoustic (e.g., a microphone, etc.) functionality, video functionality, or both and be communicatively coupled to a host (e.g., the host 102 described in connection with FIG. 1). The sensors can be generating information.

At block 754, the method 750 can include identifying one or more attributes of the data. For example, an attribute of data can refer to a device (e.g., sensor) or a type of device (e.g., a camera) that generated the data to be stored in the memory media. In other words, an attribute of the data can refer to a characteristic of the device (e.g., sensor) that generated the data (e.g., a location on the host or positional information).

At block 756, the method 750 can include selecting, based at least in part on the one or more attributes of the data, one or more of the memory media types to write the data. The selection of a memory media type from a plurality of memory media types, of which to store the data received, can be made by a memory system controller (e.g., the controller 110 and/or a host controller 109 described in connection with FIG. 1). The controller can rank the data as described herein in connection with FIGS. 1-6 and select a memory device to store the data based on the determined rank.

Figure 8:
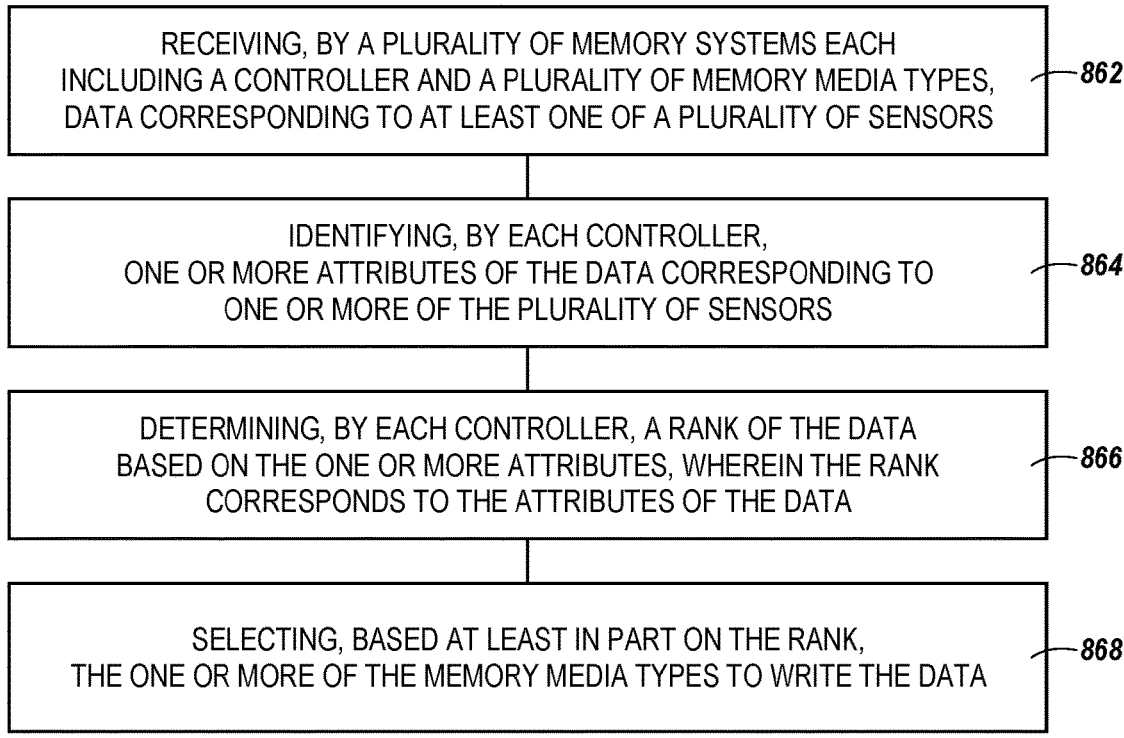
FIG. 8 is a flow diagram representing another example method for media type selection in accordance with a number of embodiments of the present disclosure.

FIG. 8 is a flow diagram representing another example method 860 for media type selection in accordance with a number of embodiments of the present disclosure. At block 862, the method 860 can include receiving, by a plurality of memory systems (e.g., the memory systems 504-1, 504-2, and/or 504-R described in connection with FIG. 5) each including a controller (e.g., the controller 110 described in connection with FIG. 1) and a plurality of memory media types (e.g., DRAM 112, SCM 114, and/or NAND 116 described in connection with FIG. 1), data corresponding to at least one of a plurality of sensors (e.g., the sensors 530 described in connection with FIG. 5).

At block 864, the method 860 can include identifying, by each controller, one or more attributes of the data corresponding to one or more of the plurality of sensors. For example, an attribute of data can refer to a device (e.g., sensor) or a type of device (e.g., a camera) that generated the data to be stored in the memory media. In other words, an attribute of the data can refer to a characteristic of the device (e.g., sensor) that generated the data (e.g., a location on the host or positional information).

At block 866, the method 860 can include determining, by each controller, a rank of the data based on the one or more attributes, wherein the rank corresponds to the attributes of the data. For example, a rank can be assigned to the data based on the attributes of the sensor that generated the data, and the data can be stored in a memory media type based on the rank of the data. Data requiring quick decisions may be ranked higher and written to a memory media including quick retrieval features (e.g., DRAM). In contrast, data received from a sensor that is determined not to require a quick decision can be ranked lower and stored in a memory media having a slower retrieval speed (e.g., NAND).

At block 868, the method 860 can include selecting, based at least in part on the rank, the one or more of the memory media types to write the data. The controller can selectively determine which memory media type is appropriate for the incoming data, based at least in part, on attributes of the data, a context of the host, information included in the data, a comparison of the data to baseline data, or a combination thereof. In some embodiments, the ranking of data can be dependent, at least in part on the context (e.g., the operation) of the host as determined by the operation of the memory systems.

For example, the method 860 can include determining, by each controller, a first operation of the plurality of memory systems (e.g., forward velocity of a host vehicle) and receiving an initial portion of data from a sensor (e.g., front camera 530-1 of FIG. 5) of the plurality of sensors during the first operation of the plurality of memory systems. Each controller can assign an initial rank corresponding to the initial portion of data, where the initial rank is assigned based on the first operation (e.g., forward motion) of the plurality of memory systems and attributes of the initial portion of data; and selecting a first memory media type (e.g., DRAM) to write the initial portion of data based on the assigned initial rank.

In other words, the controller can determine, via instructions executed from the memory devices, that the vehicle host is moving in a forward velocity and rank the initial portion of data from the front camera sensor high and store it in a quickly accessible memory media (e.g., DRAM). The rank of the initial portion of data can change when the operation of the host as determined by the memory devices changes.

For example, the method 860 can include determining, by each controller, a subsequent operation of the plurality of memory systems (e.g., forward velocity of the host vehicle) and updating the initial rank corresponding to the initial portion of data. The updated rank is assigned based on the subsequent operation of the plurality of memory systems and attributes of the initial portion of data. Said differently, the host vehicle may have changed operation (from the first operation) and is now in reverse, the initial portion of data was from a front camera and may no longer be important, thus ranked lower than when the vehicle host was moving forward. The memory systems may transfer the initial portion of data to a second memory media type (e.g., SCM or NAND) based on the updated rank and the subsequent operation of the plurality of memory systems. The memory devices can receive a subsequent portion of data during the subsequent (e.g., reverse operation).

For example, the method 860 can include receiving a subsequent portion of data (during the reverse velocity of the host vehicle) from a different sensor (e.g., a back camera sensor 530-N of FIG. 5) of the plurality of sensors during the subsequent operation of the plurality of memory systems, and assigning a subsequent rank corresponding to the subsequent portion of data, where the subsequent rank is assigned based on the subsequent operation of the plurality of memory systems and attributes of the different sensor; and selecting the first memory media type (e.g., DRAM) to write the subsequent portion of data based on the assigned subsequent rank. In other words, because the host vehicle is not in reverse velocity, the initial portion of data corresponding to the front camera has been moved from DRAM to NAND (or SCM), and the subsequent portion of data corresponding to the back camera has been ranked high and is written to DRAM.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving, by a memory system that comprises a plurality of memory media types, one or more data from at least one of a plurality of sensors;
    receiving a first data of the one or more data from a first sensor of the plurality of sensors;
    identifying information about one or more attributes of the first data from the first sensor;
    receiving a second data of the one or more data from a second sensor of the plurality of sensors;
    identifying information about one or more attributes of the second data from the second sensor;
    selecting, based at least in part on the one or more attributes of the first data and the second data, one or more of the memory media types to write the first data and the second data;
    determining, based on the identified information about the one or more attributes from the first sensor and the second sensor, a rank of the information corresponding to the first sensor and the second sensor; and
    selecting the memory media type to write the first data from the first sensor and the second data from the second sensor, wherein the memory media type selected depends on the determined rank of the information corresponding to the first sensor and the second sensor.

2. The method of claim 1, comprising selecting the memory media type included in the memory system, wherein the plurality of memory media types include Dynamic Random-Access Memory (DRAM), Storage Class Memory, and NAND or combinations thereof.

3. A method, comprising:
    receiving, by a plurality of memory systems each including a controller and a plurality of memory media types, one or more data corresponding to at least one of a plurality of sensors;
    identifying, by each controller, one or more attributes of the one or more data corresponding to one or more of the plurality of sensors;
    determining, by each controller, a rank of the one or more data based on the one or more attributes, wherein the rank corresponds to the attributes of the one or more data; and
    selecting, based at least in part on the rank, the one or more of the memory media types to write the one or more data.

4. The method of claim 3, comprising:
    determining, by each controller, a first operation of the plurality of memory systems;
    receiving an initial portion of data of the one or more data from a sensor of the plurality of sensors during the first operation of the plurality of memory systems;
    assigning an initial rank corresponding to the initial portion of data, wherein the initial rank is assigned based on the first operation of the plurality of memory systems and attributes of the initial portion of data; and
    selecting a first memory media type to write the initial portion of data based on the assigned initial rank.

5. The method of claim 4, comprising:
    determining, by each controller, a subsequent operation of the plurality of memory systems;
    updating the initial rank corresponding to the initial portion of data, wherein the updated rank is assigned based on the subsequent operation of the plurality of memory systems and attributes of the initial portion of data; and
    transferring the initial portion of data to a second memory media type based on the updated rank and the subsequent operation of the plurality of memory systems.

6. The method of claim 5, comprising:
    receiving a subsequent portion of data of the one or more data from a different sensor of the plurality of sensors during the subsequent operation of the plurality of memory systems;
    assigning a subsequent rank corresponding to the subsequent portion of data, wherein the subsequent rank is assigned based on the subsequent operation of the plurality of memory systems and attributes of the subsequent portion of the different sensor; and
    selecting the first memory media type to write the subsequent portion of data based on the assigned subsequent rank.

7. The method of claim 3, comprising:
    determining, by each controller, responsive to receiving the one or more data from the at least one of a plurality of sensors, an operation of the plurality of memory systems;

assigning the rank to the one or more data based on the determined operation of the plurality of memory systems; and
discarding a portion of the one or more data based on the assigned rank and the operation of the plurality of memory systems.

8. An apparatus, comprising:
a plurality of memory media types; and
a controller coupled to the plurality of memory media types, wherein the controller is configured to:
receive data from at least one of a plurality of sensors;
identify information about one more attributes of the data;
compare the received data from the at least one of the plurality of sensors to reference data stored in the plurality of memory media types;
identify differences between the received data and the reference data;
assign a rank to the received data based at least in part on the identified differences;
select, based at least in part on the identified information about the one or more attributes, a memory media type of the plurality of memory media types; and
write the data using the selected memory media type.

9. The apparatus of claim 8, wherein the sensors are audio, video, or both and are communicatively coupled to a host.

10. The apparatus of claim 8, wherein the one or more attributes are related to a position and a function of each of the plurality of sensors respective to a host communicatively coupled to the controller.

11. The apparatus of claim 8, wherein the information about the one or more attributes is information about a time the data is received by the controller, a position of the one or more of the plurality of sensors relative to a host communicatively coupled to the controller, an operation of the host communicatively coupled to the controller, or a combination thereof.

12. The apparatus of claim 8, wherein the controller is further configured to:
write the received data in a first memory media type of the plurality of memory media types responsive to the comparison indicating differences between the received data and the reference data; and
write the received data in a second memory media type of the plurality of memory media types responsive to the comparison indicating that the received data and the reference data is the same, wherein the first memory media type is volatile, and the second memory media type is non-volatile.

13. A system, comprising:
a plurality of sensors; and
one or more memory systems, each communicatively coupled to the plurality of sensors, wherein each of the one or more memory systems comprises a controller coupled to a plurality of memory media types, each of the controllers configured to:
receive data from at least one of a plurality sensors communicatively coupled to the host;
identify information about one or more attributes of the received data;
compare the identified information about the one or more attributes of the received data to reference data corresponding to the plurality of sensors;
select, based on the comparison of the identified information about the one or more attributes and the reference data, a memory media type of the plurality of memory media types; and
write the received data using the selected memory media type.

14. The system of claim 13, wherein:
the plurality of sensors includes multiple types of sensors on a vehicle; and
the multiple types of sensors include image sensors, audio sensors, video sensors, electronic control unit (ECU) sensors, or combinations thereof.

15. The system of claim 14, wherein the controller is further configured to store reference information for each type of sensor, wherein the stored reference information is related to the type of sensor and the location of the sensor on the vehicle.

16. The system of claim 13, wherein:
the plurality of sensors includes multiple types of sensors on an Internet of Things (IoT) Device; and
the multiple types of sensors include camera sensors, microphone sensors, video sensors, electronic control unit (ECU) sensors, or combinations thereof.

17. The system of claim 16, wherein:
the controller is further configured to store reference information for each type of sensor; and
the stored reference information is related to the type of sensor and the location of the sensor on the IoT device.

18. The system of claim 13, wherein the memory media type selected is volatile memory responsive to the determination by the controller that the reference data and the received data are different.

19. The system of claim 13, wherein the memory media type selected is non-volatile responsive to the determination by the controller that the reference data and the received data are the same.

20. A method, comprising:
receiving, by a memory system that comprises a plurality of memory media types, one or more data from at least one of a plurality of sensors;
receiving a first data of the one or more data from a first sensor of the plurality of sensors;
identifying information about one or more attributes of the first data from the first sensor;
receiving a second data of the one or more data from a second sensor of the plurality of sensors;
identifying information about one or more attributes of the second data from the second sensor;
selecting, based at least in part on the one or more attributes of the first data and the second data, one or more of the memory media types to write the first data and the second data;
determining information about the one or more attributes of the data, wherein the attributes are related to a function of the at least one of the plurality of sensors and the information is related to an image included in the data; and
determining a rank of the data based at least in part on the image and the function of the sensor.

21. A method, comprising:
receiving, by a memory system that comprises a plurality of memory media types, one or more data from at least one of a plurality of sensors;
receiving a first data of the one or more data from a first sensor of the plurality of sensors;
identifying information about one or more attributes of the first data from the first sensor;
receiving a second data of the one or more data from a second sensor of the plurality of sensors;

identifying information about one or more attributes of the second data from the second sensor;

selecting, based at least in part on the one or more attributes of the first data and the second data, one or more of the memory media types to write the first data and the second data;

determining information about the one or more attributes of the data, wherein the attributes are related to an audio function of the at least one of the plurality of sensors and the information is related to acoustic information included in the data; and determining a rank of the data based at least in part on the acoustic information and the audio function of the sensor.

22. A method, comprising:

receiving, by a memory system that comprises a plurality of memory media types, one or more data from at least one of a plurality of sensors;

receiving a first data of the one or more data from a first sensor of the plurality of sensors;

identifying information about one or more attributes of the first data from the first sensor;

receiving a second data of the one or more data from a second sensor of the plurality of sensors;

identifying information about one or more attributes of the second data from the second sensor;

selecting, based at least in part on the one or more attributes of the first data and the second data, one or more of the memory media types to write the first data and the second data;

selecting a first memory media type to write a first portion of data of either of the first data or the second data received from the at least one of the plurality of sensors; and selecting a second memory media type to write a subsequent portion of data of either of the first data or the second data received from the at least one of the plurality of sensors, wherein the first memory media type and the second memory media type are different and selected based on a determined rank of the first and the subsequent portions of the data.

* * * * *